United States Patent [19]

Denis et al.

[11] Patent Number: 5,106,515

[45] Date of Patent: Apr. 21, 1992

[54] POLYMERS DERIVED FROM UNSATURATED POLYESTERS BY ADDITION OF COMPOUNDS WITH AN AMINE FUNCTION AND THEIR USE AS ADDITIVES MODIFYING THE PROPERTIES OF PETROLEUM MIDDLE DISTILLATES WHEN COLD

[75] Inventors: Jacques Denis, Charbonniere les Bains; Jacques Garapon, Lyons; Bernard Damin, Oullins; Robert Leger, Grigny, all of France

[73] Assignees: Institut Francais du Petrole, Rueil-Malmaison; Elf France, Courbevoie, both of France

[21] Appl. No.: 618,436

[22] Filed: Nov. 27, 1990

Related U.S. Application Data

[62] Division of Ser. No. 305,813, Feb. 3, 1989, Pat. No. 5,001,202.

[30] Foreign Application Priority Data

Feb. 3, 1988 [FR] France .................. 88 01327

[51] Int. Cl.$^5$ .......................... C09K 7/06; B01F 17/16
[52] U.S. Cl. ........................................ 507/90; 252/357
[58] Field of Search ..................... 252/8.3, 357

[56] References Cited

U.S. PATENT DOCUMENTS

| | | | |
|---|---|---|---|
| 3,345,338 | 10/1967 | Merten | 528/80 |
| 3,558,563 | 1/1971 | Cunningham | 525/46 |
| 4,390,688 | 6/1983 | Walz | 528/295.3 |

*Primary Examiner*—Patricia Short
*Attorney, Agent, or Firm*—Millen, White & Zelano

[57] ABSTRACT

Disclosed is a polymer of average molecular weight ranging from 400 to 20,000 comprising amino substituted groups in its molecule and resulting from the reaction of at least one compound with a primary amine function having 1 to 60 carbon atoms with an unsaturated polyester resulting from the condensation of an unsaturated aliphatic dicarboxylic compound, comprising at least one ethylenic unsaturation in the alpha position of one of the carboxyl groups, with at least one epoxidated compound having 4 to 62 carbon atoms chosen from ethers and esters of epoxyalcohols and esters of epoxyacids.

Also disclosed is a middle distillate composition having a distillation range from 150° to 450° C. and comprising a minor proportion, preferably from 0.001 to 2% in weight, of at least one of the polymers defined hereinabove.

13 Claims, No Drawings

POLYMERS DERIVED FROM UNSATURATED POLYESTERS BY ADDITION OF COMPOUNDS WITH AN AMINE FUNCTION AND THEIR USE AS ADDITIVES MODIFYING THE PROPERTIES OF PETROLEUM MIDDLE DISTILLATES WHEN COLD

This is a division of application Ser. No. 07/305,813 filed Feb. 3, 1989, now U.S. Pat. No. 5,001,202.

SUMMARY OF THE INVENTION

The present invention concerns modified polymers comprising amino-substituted side groups derived from compounds with a primary amine function.

The polymers of the present invention can be particularly used as additives allowing improvement of the flow properties of petroleum middle distillates (fuels and gas oils) when cold.

The modified polymers of the present invention result from reaction of at least one compound with a primary amine function having one of the general formulae (III) or (IV), described hereinafter, with a condensation polymer (unsaturated polyester) resulting from the condensation of at least one unsaturated aliphatic dicarboxylic compound, preferably vicinal, comprising at least one ethylenic unsaturation in the alpha position of one of the carboxyl groups (hereinafter called "dicarboxylic compound"), usually having 4 to 60 carbon atoms, preferably 4 to 30 carbon atoms and most often 4 to 8 carbon atoms in its molecule, with at least one aliphatic epoxide (hereinafter called "epoxidate compound") having one of the general formulae (I) or (II) described hereinafter.

It has surprisingly been discovered that the modified polymers of the present invention are additives that lead to great improvement of the flow properties of hydrocarbon middle distillates when cold, in particular, improvement in the flow point and/or chill point of gas oils.

The condensation polymers used to prepare the modified polymers of the present invention are obtained by conventional methods for preparation of condensation polymers known to professionals in the field.

The dicarboxylic compounds used in the present invention are usually preferably a mono-unsaturated compound having 4 to 8 carbon atoms per molecule, for example, maleic acid, fumaric acid, itaconic acid, citraconic acid, mesaconic acid and glutaconic acid.

The dicarboxylic compound is preferably a mono-unsaturated cyclic anhydride such as maleic anhydride, alkylmaleic anhydrides and alkenyl-succinic anhydrides.

Within the scope of the invention, the anhydrides preferred are maleic anhydride, citraconic (methylmaleic) anhydride and itaconic (methylene-succinic) anhydride.

The epoxidated compound used within the scope of the present invention is a compound usually having 4 to 62 carbon atoms, preferably 4 to 40 carbon atoms, most often 6 to 40 carbon atoms and advantageously 8 to 40 carbon atoms in its molecule.

Within the scope of the present invention, monoepoxidated compounds are preferably used or mixtures of epoxidated compounds, preferably comprising a proportion of at least 50% in mole of monoepoxidated compounds and containing several epoxide groups (oxirane cycles) in their molecule, for example, two or three epoxide groups. The molar proportion of these compounds, called polyepoxidated compounds, in the mixture of epoxidated compounds is usually less than 40% and more advantageously less than 30%.

The aliphatic epoxidated compounds in the present invention have one of the following general formulae:

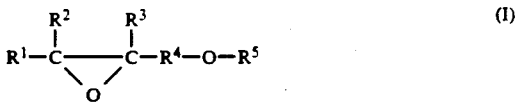

and

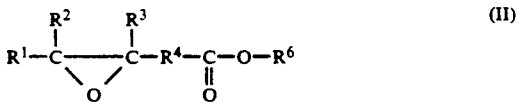

in which $R^1$ and $R^3$, identical or different, each represent a hydrogen atom or a lower alkyl group having for example 1 to 4 carbon atoms, such as methyl, ethyl, propyls and butyls; $R^2$ represents a hydrogen atom, an alkyl group, preferably substantially linear, having 1 to 57 carbon atoms, preferably 1 to 35 carbon atoms or an aliphtaic group, preferably substantially linear, comprising one or more oxirane cycles in the chain and having 3 to 57 carbon atoms, preferably 3 to 35 carbon atoms and more particularly 4 to 35 carbon atoms; $R^4$ represents an alkylene group, preferably substantially linear, having 1 to 57 carbon atoms, preferably 1 to 35 carbon atoms; $R^5$ represents an alkyl group, preferably substantially linear, having 1 to 57 carbon atoms, preferably 1 to 35 carbon atoms and more particularly 4 to 35 carbon atoms or an alkanoyl group of formula

$R^6$ in these formulae represents an alkyl group, preferably substantially linear, having 1 to 56 carbon atoms, preferably 1 to 34 carbon atoms and more particularly 4 to 34 carbon atoms.

The preferred epoxidated compounds are those in which $R^1$ and $R^3$ each represent a hydrogen atom, as well as those in which $R^1$, $R^2$ and $R^3$ each represent a hydrogen atom.

The following can be cited as examples of preferred epoxidated compounds: compounds in which $R^1$ and $R^3$ each represent a hydrogen atom and in which $R^2$ represents a hydrogen atom, an alkyl group, preferably substantially linear, having 6 to 35 carbon atoms or an aliphatic group, preferably substantially linear, comprising one or more oxirane cycles of formula

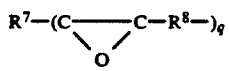

in which $R^7$ is an alkyl group, preferably substantially linear, having 1 to 54 carbon atoms, preferably 1 to 32 carbon atoms, $R^8$ is an alkylene group, preferably substantially linear, having 1 to 54 carbon atoms, preferably 1 to 32 carbon atoms and q is a whole number from 1 to 5, preferably from 1 to 3, the $R^4$, $R^5$ and $R^6$ groups having the definitions given hereinabove.

Among the compounds mentioned hereinabove, the following can be cited as examples of preferred compounds: epoxidated compounds of formula (I) in which $R^4$ represents a methylene group and epoxidated compounds of formula (II) in which $R^4$ represents an alkylene group having 4 to 24 carbon atoms.

The following can be cited as specific examples of aliphatic monoepoxidated compounds:
3-ethoxy-1,2-epoxypropane, 3-propxy-1,2-epoxypropane, 3-butoxy-1,2-epoxypropane, 3-pentyloxy-1,2-epoxypropane, 3-hexyloxy-1,2-epoxypropane, 3-hexyloxy-1,2-epoxypropane, 3-heptyloxy-1,2-epoxypropane, 3-octyloxy-1,2-epoxypropane, 3-decyloxy-1,2-epoxypropane, 3-dodecyloxy-1,2-epoxypropane, 1-acetoxy-2,3-epoxypropane, 1-butyryloxy-2,3-epoxypropane, 1-lauroyloxy-2,3-epoxypropane, 3-myristoyloxy-1,2-epoxypropane, 3-palmitoyloxy-1,2-epoxypropane, 3-stearoyloxy-1,2-epoxypropane, alkyl esters, for example methyl, ethyl, propyl, butyl, 2-ethylhexyl and 2-ethylhexadecyl esters of 3,4-epoxy butanoic, 4,5-epoxypentanoic, 3,4-epoxynonanoic, 10,11-epoxyundecanoic, 6,7-epoxyoctadecanoic, 12,13-epoxyoctadecanoic, 11,12-epoxyoctadecanoic, 9,10-epoxyoctadecanoic, 11,12-epoxyeicosanoic and 13,14-epoxydocosanoic acids.

The following can be cited as specific examples of mixtures of epoxidated compounds comprising polyepoxides: alkyl ester mixtures obtained by esterification of a mixture of epoxy-acids resulting from epoxidation of a mixture of fatty acids with ethylenic unsaturations. The mixture of fatty acids with ethylenic unsaturations is, for example, a mixture comprising, in the approximate weight proportions given in table I hereinafter, acids having 12 to 20 carbon atoms in their molecule and containing saturated and unsaturated acids. This mixture is usually called olein.

TABLE I

| ACIDS | $C_{12}$* | $C_{14}$* | $C_{14.1}$ | $C_{15}$* | $C_{16}$* | $C_{16.1}$ | $C_{17.1}$ | $C_{18}$* | $C_{18.1}$ | $C_{18.2}$ | $C_{18.3}$ | $C_{20.1}$ |
|---|---|---|---|---|---|---|---|---|---|---|---|---|
| % Weight | 0.8 | 2.7 | 1.0 | 0.5 | 5.0 | 5.5 | 1.5 | 1.5 | 68.0 | 10.0 | 2.5 | 1.0 |

*saturated acids

In table I hereinabove, $C_{p.1}$ designates acids comprising one ethylenic unsaturation, $C_{p.2}$ designates acids comprising 2 ethylenic unsaturations and $C_{p.3}$ designates acids comprising 3 ethylenic unsaturations (p is the number of carbon atoms).

In order to esterify the epoxy-acid mixture, a mixture, for example, of alcohols comprising 95% of n-hexadecylic alcohol, 3% of n-octadecylic alcohol and 2% of alcohols having more than 18 carbon atoms in their molecule can be used. It should be understood that it is also possible to use one or more compounds of formula (I) and/or one or more compounds of formula (II) as epoxidated compounds.

The unsaturated polyester is usually obtained by reacting at least one dicarboxylic compound (as defined hereinabove) with at least one epoxidated compound (as defined hereinabove) in the presence of a condensation catalyst, for example, a strong acid or a titanium salt, for example, an alkyl titanate, n-butyl titanate in particular.

Condensation between at least one dicarboxylic compound and at least one epoxidated compound can be carried out in the presence or absence of a solvent. For example, a hydrocarbon solvent such as benzene, hexane, cyclohexane, toluene, xylene or a mixture of hydrocarbons, for example, a hydrocarbon cut with a high boiling point such as a kerosene or a gas oil can be used.

The condensation reaction is usually carried out at a temperature from about 30° to 200° C., and preferably from about 50° to 160° C., for about 30 minutes to 30 hours, and preferably for about 2 hours to 15 hours.

Condensation between the dicarboxylic compound and the epoxidated compound is carried out using quantities of each of these compounds such that the epoxidated compound/dicarboxylic compound molar ratio is usually from about 0.4:1 to 1.8:1, preferably from about 0.8:1 to 1.2:1 and more particularly from about 0.9:1 to 1.1:1.

The unsaturated polyester obtained in this way is then reacted with at least one compound with a primary amine function as defined hereinafter. The reaction is usually carried out in the presence of a solvent which can be identical or different to that used in the unsaturated polyester preparation step.

When the solvent used in this addition reaction of the compound with an amine function is the same as that used during formation of the polyester, it is possible to not isolate the polyester and to carry out the reaction on the raw polycondensation product, possibly after having removed the catalyst used in the polycondensation.

When the polycondensation has been carried out without using a solvent, the polyester is preferably first dissolved in a quantity of solvent, usually representing in weight the weight of the polyester formed, then the addition reaction to the compound with a primary amine group is carried out.

The compounds with a primary amine group used usually comprise 1 to 61 carbon atoms, preferably 6 to 47 carbon atoms and more particularly 8 to 47 carbon atoms in their molecule. These compounds with a primary amine group have one of the following general formulae:

 (III)

and

 (IV)

in which $R^9$ represents an aliphatic group having 1 to 60 carbon atoms, preferably 6 to 46 carbon atoms, preferably saturated; Z is chosen from the groups —O—, —NH— and —NR$^{11}$—, in which $R^{11}$ represents an aliphatic group, preferably saturated, having 1 to 60 carbon atoms, preferably 6 to 40 carbon atoms and in which $R^{11}$ is preferentially a substantially linear group; n is a whole number from 2 to 4; m is zero when Z is —NH— or a whole number from 1 to 4 in all cases; $R^{10}$ represents an aliphatic group, which is preferably saturated and bivalent, having 2 to 61 carbon atoms, preferably 6 to 47 carbon atoms and more particularly from 8 to 47 carbon atoms.

The compounds of formula (III) above may be primary monoalkylamines of formula $R^9$—NH$_2$ (in this case, in formula (I), Z represents the —NH— group and the value of m is zero).

The R$^9$ group is preferably substantially linear and contains 6 to 46 carbon atoms and preferably 8 to 46 carbon atoms and advantageously 10 to 46 carbon atoms.

The following can be cited as specific examples of these amines: methylamine, ethylamine, propylamine, butylamine, pentylamine, hexylamine, heptylamine, octylamine, nonylamine, decylamine, dodecylamine, tetradecylamine, hexadecylamine, octadecylamine, eicosylamine and docosylamine.

Compounds of formula (III) can also be aliphatic polyamines, preferably saturated, of formula:

$$R^9-NH\text{+}CH_2\text{+}_n-NH\text{+}_m H$$

which corresponds to general formula (III) in which Z represents the —NH— group; m can have a value from 1 to 4 and n a value from 2 to 4, preferably 3; R$^9$ is as defined hereinabove, the number of carbon atoms of the polyamine used usually being from 3 to 61, preferably from 6 to 47, more particularly from 8 to 47 and advantageously from 10 to 47.

The following can be cited as examples of specific compounds: N-alkyl-1,3-diaminopropanes in which the alkyl group includes 5 to 24 carbon atoms and preferably 7 to 24 carbon atoms, for example, N-dodecyl-1,3-diaminopropane, N-tetradecyl-1,3-diaminopropane, N-hexadecyl-1,3-diaminopropane, N-octadecyl-1,3-diaminopropane, N-eicosyl-1,3-diaminopropane and N-docosyl-1,3-diaminopropane. We can also cite N-alkyl dipropylene triamines in which the alkyl group includes 2 to 24 carbon atoms and for example, among compounds whose alkyl group includes 12 to 24 carbon atoms, N-hexadecyldipropylene triamine, N-octadecyldipropylene triamine, N-eicosyldipropylene triamine and N-docosyldipropylene triamine.

Compounds of formula (III) can also be polyamines of formula:

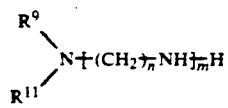

corresponding to general formula (III), in which Z represents—NR$^{11}$— and in which R$^9$ and R$^{11}$, identical or different, each represent an alkyl group having 1 to 60 carbon atoms, preferably 6 to 40 carbon atoms, R$^9$ and R$^{11}$ usually contain 7 to 61 carbon atoms between them and preferably 8 to 46 carbon atoms; n has a whole value from 2 to 4 and m a whole value from 1 to 4; R$^9$ and R$^{11}$ are preferably substantially linear.

The following can be cited as examples of specific compounds: N,N-diethyl-1,2-diaminoethane, N,N-diisopropyl-1,2-diaminoethane, N,N-diisobutyl-1,2-diaminoethane, N,N-diethyl-1,4-diaminobutane, N,N-dimethyl-1,3-diaminopropane, N,N-diethyl-1,3-diaminopropane, N,N-dioctyl-1,3-diaminopropane, N,N-didecyl-1,3-diaminopropane, N,N-didodecyl-1,3-diaminopropane, N,N-ditetradecyl-1,3-diaminopropane, N,N-dihexadecyl-1,3-diaminopropane, N,N-dioctadecyl-1,3-diaminopropane, N,N-didodecyldipropylene triamine, N,N-ditetradecyldipropylene triamine, N,N-dihexadecyldipropylene triamine, N,N-dioctadecyldipropylene triamine, N-methyl-N-butyl-1,2-diaminoethane, N-methyl-N-octyl-1,2-diaminoethane, N-ethyl-N-octyl-1,2-diaminoethane, N-methyl-N-decyl-1,2-diaminoethane, N-methyl-N-dodecyl-1,3-diaminopropane, N-methyl-N-hexadecyl-1,3-diaminopropane, N-ethyl-N-octadecyl-1,3-diaminopropane.

Finally, compounds of formula (III) can be etheramines more particularly of formula:

$$R^9-O[(CH_2)_n NH]_m H$$

which corresponds to general formula (III) in which Z is an oxygen atom; the R$^9$ is preferably substantially linear and has the definition given hereinabove; m is a whole number from 1 to 4 and n is a whole number from 2 to 4, preferably 2 or 3.

Among the alkyl-ether-amines, the following can be cited as examples of specific compounds: 2-methoxyethylamine, 3-methoxypropylamine, 4-methoxybutylamine, 3-ethoxypropylamine, 3-octyloxypropylamine, 3-decyloxypropylamine, 3-hexadecyloxypropylamine, 3-eicosyloxypropylamine, 3-docosyloxypropylamine, N-(3-octyloxypropyl)-1,3-diaminopropane, N-(3-decyloxypropyl)-1,3-diaminopropane, (2,4,6-trimethyldecyl)-3-oxypropylamine and N-(2,4,6-trimethyldecyl)-3-oxypropyl-1,3-diaminopropane.

The compounds with a primary amine function involved in the preparation of the modified copolymers of the invention may also be aminoalcohols of formula (IV):

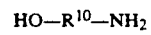

$$HO-R^{10}-NH_2$$

in which R$^{10}$ represents an aliphatic radical, preferably saturated, bivalent, linear or branched, preferably substantially linear, having the definition given hereinabove. Aminoalcohols comprising a primary alcohol function are preferably used.

The following can be cited as examples of specific compounds: monoethanolamine, 1-amino-3-propanol, 1-amino-4-butanol, 1-amino-5-pentanol, 1-amino-6-hexanol, 1-amino-7-heptanol, 1-amino-8-octanol, 1-amino-10-decanol, 1-amino-11-undecanol, 1-amino-13-tridecanol, 1-amino-14-tetradecanol, 1-amino-16-hexadecanol, 2-amino-2-methyl-1-propanol, 2-amino-1-butanol and 2-amino-1-pentanol.

It should be understood that it is possible to use one or more compounds of general formula (III) and/or one or more compounds of general formula (IV) as a compound with a primary amine function.

The following can be cited as specific examples of a mixture of compounds with a primary amine function:
primary fatty amine cuts whose alkyl chains comprise, in the approximate molar proportions given in the table below, $C_9$, $C_{10}$, $C_{12}$, $C_{14}$, $C_{16}$, $C_{18}$, $C_{20}$ and $C_{22}$ chains.

|     | Alkyl chains | | | | | | | |
| --- | --- | --- | --- | --- | --- | --- | --- | --- |
| Cut | $C_8$ | $C_{10}$ | $C_{12}$ | $C_{14}$ | $C_{16}$ | $C_{18}$ | $C_{20}$ | $C_{22}$ |
| A | 0 | 0 | 0 | 1% | 28% | 71% | 0 | 0 |
| B | 0 | 0 | 0 | 1% | 5% | 42% | 12% | 40% |

-continued

| | Alkyl chains | | | | | | | |
|---|---|---|---|---|---|---|---|---|
| Cut | $C_8$ | $C_{10}$ | $C_{12}$ | $C_{14}$ | $C_{16}$ | $C_{18}$ | $C_{20}$ | $C_{22}$ |
| C* | 3% | 6% | 56% | 18% | 10% | 7% | 0 | 0 |

*Cut C contains 5% of unsaturated $C_{18}$ alkyl chains and 2% of saturated $C_{18}$ alkyl chains.

The addition reaction of the compound with a primary amine function to an unsaturated polyester is usually carried out with straightforward heating at a temperature usually from about 5° to 200° C., preferably from about 40° to 160° C., for example at about 60° C. The reaction is carried out by addition of the compound with a primary amine function to the unsaturated polyester dissolved in a solvent chosen, for example, from those mentioned hereinabove and by heating at the temperature chosen for the length of time long necessary for the reaction to be sufficiently complete. The length of time of the reaction between the compound with a primary amine function and the unsaturated polyester is usually from about 1 to 24 hours and most often from about 2 to 10 hours, for example, about 3 hours. The quantity of compound with a primary amine function reacted is usually from 0.2 to 1.5 mole, preferably from 0.4 to 1.2 mole and most preferably from 0.5 to 1.1 mole per mole of dicarboxylic compound used in the formation of the unsaturated polyester. The quantity of compound with a primary amine function is, for example, about 1 mole per mole of dicarboxylic compound.

The modified polymers of the present invention which can be advantageously used as additives in petroleum middle distillates are those comprising substantially linear side chains having at least 8 carbon atoms, preferably 10 carbon atoms and most preferably 12 carbon atoms, said chain possibly including oxygen and/or nitrogen atoms. These side chains can be provided by the epoxidated compound used in the preparation of the unsaturated polyester or the compound with a primary amine function reacted with the unsaturated polyester, or provided by both the epoxidated compound and the compound with a primary amine function.

The modified polymers according to the invention used as additives in petroleum middle distillates are preferably those which include side chains having at least 8 carbon atoms and advantageously at least 10 carbon atoms and most preferably at least 12 carbon atoms, provided by both the epoxidated compound used in the preparation of the unsaturated polyester and the compound with a primary amine function racted with the unsaturated polyester.

The modified polymers according to the invention usually have molecular weights ranging from about 400 to 20,000, preferably from about 500 to 10,000 and most often from about 500 to 7,000.

The preferred modified polymers according to the invention, as defined hereinabove, allow simultaneous improvement in the chill point and the flow point of petroleum middle distillates, which makes them particularly attractive to the refiner.

The additives are obtained in solution in the solvent chosen and can be directly used in this form in petroleum middle distillates (for example, in gas oils) whose flow and chill points we wish to improve.

In order to observe obvious simultaneous improvement in the chill point and the flow point of the gas oil cuts contemplated in the invention and defined hereinafter, it is necessary to add these additives at concentrations, for example, from 0.001 to 2% in weight, preferably from 0.01 to 1% in weight and more advantageously from 0.02 to 0.3% in weight.

The gas oil compositions according to the invention comprise a major proportion of petroleum middle distillate having a distillation range according to the ASTM D 8667 norm between 150° and 450° C. (fuel-oils, gas oils) and a minor proportion, sufficient for simultaneous decrease in the chill point and the flow point, of at least one modified polymer defined hereinabove.

The gas oils contemplated in particular have a distillation range from an initial temperature of about 160° to 190° C. to a final temperature of about 360° to 430° C.

Gas oil compositions comprising a major proportion of middle distillate and at least one additive chosen from the modified polymers according to the invention, defined hereinabove, in a quantity sufficient for simultaneous decrease in the chill point and the flow point, can also include other additives such as antioxidant additives, sludge dispersants, corrosion inhibitors, etc.

The compositions usually comprise at least 95% and preferably at least 98% by weight of middle distillate.

The decrease in the flow point can be, for example, up to 15° C. or more. Furthermore, simultaneous decrease in the chill point observed which can be, for example, up to 2° C. or more.

The modified polymers used in the invention allow, due to their action on the kinetic phenomena of crystallization, of paraffins in particular, and by modification of the size of the crystals formed, use of the suspension at a lower temperature without obstruction of pipes or clogging of filters. When paraffin crystals appear, whose formation is provoked by cooling, their natural tendency is to gather in the lower part of pipes due to gravity. This phenomenon, known as sedimentation, leads to obstruction of pipes and clogging of filters and is prejudicial to the use of middle distillates, gas oils and domestic fuels in particular, at low temperatures. The modified polymers of the invention decrease the sedimentation rate of paraffins formed by cooling of gas oils and other middle distillates; the paraffins, remaining in suspension longer, settle less on the sides of pipes in contact with the gas oils and other middle distillates, thus slowing down obstruction of said pipes and allowing a product of given characteristics to be used at a much lower temperature or to use a product at a given temperature, a product which, obtained by the refiner without modification of the distillation chart, does not initially have the required specifications. (These specifications are at present becoming stricter.)

EXAMPLES

The following examples illustrate the invention without in any way limiting its scope.

In gas oil cuts used in the examples are those given in table II. They are characterized according to the ASTM D 8667 distillation norm. These gas oil cuts of ARAMCO origin are designated $G_1$ and $G_2$; their densities are also given in table II.

Two determinations are carried out for $G_1$ and $G_2$ cuts without additives and for compositions containing an additive:
the chill point, according to the ASTM D 2500-66 norm
the flow point, according to the ASTM D97-66 norm.

TABLE II

| Gas oils | ASTM distillation | | % distilled at 350° C. | Density at 15° C. in kg/l |
|---|---|---|---|---|
| | Pi °C. | Pf °C. | | |
| $G_1$ | 189 | 373 | 95 | 0.844 |
| $G_2$ | 177 | 373 | 92 | 0.836 |

EXAMPLE 1 (COMPARATIVE)

14.7 g (0.15 mole) of maleic anhydride, 19.5 g (0.15 molar equivalent) of n-butoxy-1-epoxy-2,3-propane and 17.6 g of xylene are introduced into a 250-ml reactor equipped with a cooler and a stirring system. The temperature is brought to 60° C., then 0.15 g of n-butyl titanate is introduced and the mixture is maintained at 60° C. for 14 hours, with continuous stirring. An unsaturated polyester in the form of a yellow product is obtained which can be characterized using conventional analysis methods: its IR spectrum shows the disappearance of maleic anhydride bands at 1850 $cm^{-1}$ and 1780 $cm^{-1}$ and the appearance of a strong ester band at 1720 $cm^{-1}$.

The polymer obtained is diluted to 50% in weight in xylene. This solution constitutes additive A stock solution.

EXAMPLES 2 TO 4

The same solution of the same polyester described in example 1 is prepared in the same way as in example 1 and addition of compounds having primary amine functions to various parts of this unsaturated polyester is carried out.

EXAMPLE 2

42 g (0.15 molar equivalent of primary amine) of a primary fatty amine cut, whose alkyl chains comprise on average in moles 1% of $C_{14}$, 28% of $C_{16}$ and 71% of $C_{18}$, are added to the reactor containing the unsaturated polyester. After heating for 3 hours at 60° C., with continuous stirring, a solution of a product is obtained which can be characterized using conventional analysis methods following evaporation of the solvent: its average molecular weight is 6500, its polydispersal is 1.2 (measured with Steric Exclusion Chromatography (S.E.C.)), the N.M.R. spectrum shows the disappearance of the unsaturation and confirms addition of an amine onto the double bond. Infrared spectrometry also shows disappearance of the band corresponding to the ethylenic unsaturation of the original polymer. The solution obtained is diluted in xylene such that a solution at 50% in weight of product is obtained. This constitutes additive A1 stock solution.

EXAMPLE 3

The primary fatty amine cut added to the polyester consists of primary amines whose alkyl chains comprise, in moles, about 3% of $C_8$, 6% of $C_{10}$, 56% of $C_{12}$, 18% of $C_{14}$, 10% of $C_{16}$, 2% of $C_{18}$ and 5% of unsaturated $C_{18}$. The operating procedure is identical in all points to that described in example 2.

The IR and NMR spectra of the product show the same characteristic bands as those of additive A1. A solution of additive A2 is thus obtained. Additive A2 has an average molecular weight of 4 700 and its polydispersal is 1.33 (measured with S.E.C.).

EXAMPLE 4

The primary fatty amine cut added to the polyester consists of primary amines whose alkyl chains comprise, in moles, about 1% of $C_{14}$, 5% of $C_{16}$, 42% of $C_{18}$, 12% of $C_{20}$ and 40% of $C_{22}$. The operating procedure is identical in all points to that described in example 2.

The IR and NMR spectra of the product show the same characteristic bands as those of additive A1. A solution of additive A3 is thus obtained. Additive A2 has an average molecular weight of 6 300 and its polydispersal is 1.2 (measured with S.E.C.).

EXAMPLE 5 (COMPARATIVE)

A solution of an unsaturated polyester is prepared in the same way as in example 1 but differs from that described in example 1 in that a hexadecyl epoxystearate cut is used as the epoxidated compound. This cut was obtained by epoxidation of olein (mixture of unsaturated fatty acids whose average weight composition is given in table I of the text of the present application), followed by esterification of the epoxy-acid mixture obtained by a mixture of alcohols comprising, in approximate weight proportions, 95% of n-hexadecylic alcohol, 3% of n-octadecylic alcohol and 2% of an alcohol having more than 18 carbon atoms in its molecule. After dilution in xylene to 50% in weight, a solution of additive B is obtained.

EXAMPLES 6 TO 9

The same solution of the same polyester described in example 5 is obtained in the same way as in example 5 and addition of the compounds with primary amine functions onto various parts of this unsaturated polyester is carried out according to the operating procedure described in example 2 and according to the molar proportions of example 2. The infrared and N.M.R. spectra confirm the structure of the products and, in particular, addition of compounds with a primary amine founction onto the double bond.

EXAMPLE 6

The primary amine added to the polyester is n-octadecylamine. A solution of additive B1 is thus obtained.

EXAMPLE 7

The primary fatty amine cut added to the polyester consists of primary amines whose alkyl chains comprise, in moles, about 1% of $C_{14}$, 28% of $C_{16}$ and 71% of $C_{18}$. A solution of additive B2 is thus obtained. Additive B2 has an average molecular weight of 2 800 and its polydispersal is 1.65 (measured with S.E.C.).

EXAMPLE 8

The primary fatty amine cut added to the polyester consists of primary amines whose alkyl chains comprise about 3% of $C_8$, 6% of $C_{10}$, 56% of $C_{12}$, 18% of $C_{14}$, 10% of $C_{16}$, 2% of $C_{18}$ and 5% of unsaturated $C_{18}$. A solution of additive B3 is thus obtained. Additive B3 has an average molecular weight of 2 600 and its polydispersal is 1.72 (measured with S.E.C.).

EXAMPLE 9

The primary fatty amine cut added to the polyester consists of primary amines whose alkyl chains comprise, in moles, about 1% of $C_{14}$, 5% of $C_{16}$, 42% of $C_{18}$, 12% of $C_{20}$ and 40% of $C_{22}$. A solution of additive B4 is thus obtained. Additive B4 has an average molecular weight of 2 200 and its polydispersal is 2.15 (measured with S.E.C.).

The additives described hereinabove are obtained in solution in xylene. The concentration of the solution is adjusted to 50% in weight of dry matter. This provides stock solutions of these additives whose activity is tested by incorporating them at a proportion of 0.1% in weight with respect to the gas oil whose characteristics were given in table II hereinabove.

The results of these determinations are grouped together in table III hereinafter. They clearly show simultaneous improvement of the chill point and the flow point which allow us to obtain the modified polymers according to the invention with respect to a gas oil without an additive and with respect to use of a non-modified unsaturated polyester (A or B) (comparative example).

TABLE III

| Additives | Chill point (°C.) | | Flow point (°C.) | |
|---|---|---|---|---|
| % weight | G1 | G2 | G1 | G2 |
| nil | −1 | −2 | −9 | −9 |
| 0.1% A | −1 | −2 | −9 | −9 |
| 0.1% A1 | −2 | −3 | −12 | −12 |
| 0.1% A2 | −3 | −3 | −15 | −18 |
| 0.1% A3 | −3 | −4 | −12 | −12 |
| 0.1% B | −1 | −2 | −9 | −9 |
| 0.1% B1 | −3 | −4 | −12 | −12 |
| 0.1% B2 | −3 | −4 | −12 | −12 |
| 0.1% B3 | −2 | −3 | −24 | −24 |
| 0.1% B4 | −3 | −4 | −15 | −12 |

What is claimed is:

1. A petroleum middle distillate composition comprising a major proportion of middle distillate having a distillation range between 150° and 450° C. and a minor proportion, sufficient for simultaneous decrease in the chill point and flow point, of at least one polymer comprising a substantially linear side chain having at least 8 carbon atoms, said polymer being of an average molecular weight ranging from 400 to 20,000, comprising amino-substituted groups resulting from an addition reaction of at least one compound having a primary amine function, comprising 1 to 61 carbon atoms, and being of one of the general formulae:

and

in which $R^9$ represents an aliphatic group having 1 to 60 carbon atoms, Z is —O—, —NH—, or —NR$^{11}$—, in which $R^{11}$ represents an aliphatic group having 1 to 60 carbon atoms, n is a whole number from 2 to 4 inclusive, m is zero to 4 inclusive when Z is —NH—, or a whole number from 1 to 4 inclusive in all other cases, $R^{10}$ represents a bivalent aliphatic group having 2 to 61 carbon atoms, with an unsaturated polyester resulting from the condensation of at least one alpha ethylenically unsaturated dicarboxylic compound with at least one epoxidated compound having 4 to 62 carbon atoms and being one of the general formulae

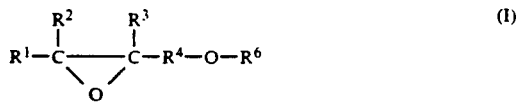

and

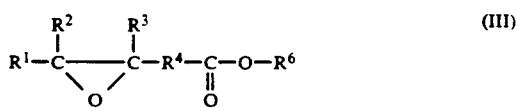

in which $R^1$ and $R^3$, identical or different, each represent a hydrogen atom or a lower alkyl group having 1 to 4 carbon atoms, $R^2$ represents a hydrogen atom, an alkyl group having 1 to 57 carbon atoms or an aliphatic group comprising 1 or more oxirane cycles and having 3 to 57 carbon atoms, $R^4$ represents an alkylene group having 1 to 57 carbon atoms, $R^5$ represents an alkyl group having 1 to 57 carbon atoms or an alkanoyl group of formula

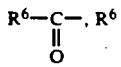

represents an alkyl group having 1 to 56 carbon atoms, the epoxidated compound/dicarboxylic compound molar ratio being from about 0.4:1 to 1.8:1 and the compound having a primary amine function/dicarboxylic compound molar ratio being from about 0.2:1 to 1.5:1.

2. A middle distillate composition according to claim 1, the petroleum component of the composition consisting essentially of a gas oil cut having a distillation range from an initial temperature of about 160° to 190° C. to a final temperature of about 360° to 430° C. and wherein the proportion of polymer is from 0.001 to 2% in weight.

3. A petroleum distillate composition according to claim 1, wherein said substantially linear side chains contain at least 10 carbon atoms.

4. A petroleum distillate composition according to claim 1, wherein said substantially linear side chains contain at least 12 carbon atoms.

5. A petroleum distillate composition according to claim 1, wherein said side chains having at least 8 carbon atoms are provided by at least the compound having a primary amine function.

6. A petroleum distillate composition according to claim 1, wherein said side chains having at least 8 carbon atoms are provided by at least the epoxidated compound.

7. A petroleum distillate composition according to claim 1, wherein said side chains having at least 8 carbon atoms are provided by both the epoxidated compound and the compound having a primary amine mean function.

8. A petroleum middle distillate composition according to claim 1, wherein the polymer has a molecular weight of 500 to 10,000.

9. A petroleum middle distillate composition according to claim 1, wherein the polymer has a molecular weight of 500 to 7,000.

10. A petroleum middle distillate composition according to claim 2, wherein the polymer has a molecular weight of 500 to 10,000.

11. A petroleum middle distillate composition according to claim 2, wherein the polymer has a molecular weight of 500 to 7,000.

12. A petroleum distillate composition according to claim 1, wherein the proportion of polymer is from 0.01 to 1% by weight.

13. A petroleum distillate composition according to claim 1, wherein the proportion of polymer is from 0.02 to 0.3% by weight.

* * * * *